US012039690B2

(12) United States Patent
Rappaport et al.

(10) Patent No.: US 12,039,690 B2
(45) Date of Patent: Jul. 16, 2024

(54) IMAGE ROTATION FOR STREAM OF INPUT IMAGES

(71) Applicant: Microsoft Technology Licensing, LLC, Redmond, WA (US)

(72) Inventors: David Justin Rappaport, Seattle, WA (US); Russell I. Sanchez, Seattle, WA (US); Jonathan L. Worsley, Woodinville, WA (US); Kae-Ling J. Gurr, Seattle, WA (US); Karlton David Powell, Lake Stevens, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 215 days.

(21) Appl. No.: 17/362,645

(22) Filed: Jun. 29, 2021

(65) Prior Publication Data

US 2022/0414819 A1    Dec. 29, 2022

(51) Int. Cl.
*G06T 3/10* (2024.01)
*G06T 3/147* (2024.01)
*G06T 5/80* (2024.01)

(52) U.S. Cl.
CPC ............... *G06T 3/10* (2024.01); *G06T 3/147* (2024.01); *G06T 5/80* (2024.01)

(58) Field of Classification Search
CPC ..... G06T 3/0056; G06T 3/0075; G06T 5/006; H04N 21/44008; H04N 21/440245; H04N 23/611; H04N 23/69; G06F 2200/1614; G06F 2200/1637; G06F 1/1686
See application file for complete search history.

(56) References Cited

U.S. PATENT DOCUMENTS

| 2013/0121531 | A1* | 5/2013 | Lefevre ................. G09G 5/377 |
| | | | 382/103 |
| 2020/0364832 | A1* | 11/2020 | Hu ......................... G06V 10/50 |
| 2021/0044725 | A1 | 2/2021 | Powell |
| 2021/0099505 | A1* | 4/2021 | Ravine ................... H04L 65/60 |
| 2021/0118089 | A1* | 4/2021 | Hare ....................... G06T 3/005 |
| 2021/0195118 | A1 | 6/2021 | Mustapha |

OTHER PUBLICATIONS

"International Search Report and Written Opinion Issued in PCT Application No. PCT/US22/030157", Mailed Date: Sep. 1, 2022, 12 Pages.
Warren, Tom, "Microsoft Surface Hub 2 demo", Retrieved from: https://www.youtube.com/watch?v=IPEE-zOcnKl&t=16s, Sep. 24, 2018, 5 Pages.

* cited by examiner

*Primary Examiner* — Chan S Park
*Assistant Examiner* — Daniel C Chang

(57) ABSTRACT

A method for processing a stream of input images is described. A stream of input images that are from an image sensor is received. The stream comprises an initial sequence of input images including a subject having an initial orientation. A change in an angular orientation of the image sensor while receiving the stream of input images is determined. In response to determining the change in the angular orientation, a subsequent sequence of input images of the stream of input images is processed for rotation to counteract the change in the angular orientation of the image sensor and maintain the subject in the initial orientation. The stream of input images is transmitted to one or more display devices.

14 Claims, 11 Drawing Sheets

IMAGE ROTATION FOR STREAM OF INPUT IMAGES

BACKGROUND

When a user participates in a video conferencing call using a tablet (or similar rotatable device with a camera module) to record themselves, the user may rotate the tablet to change a screen of the tablet from a landscape orientation to a portrait orientation. The recording may be captured by an image sensor of the tablet as a stream of input images, which may then be transmitted to other participants in the video conferencing call. As an angular orientation of the tablet is changed while rotating from the landscape orientation to the portrait orientation (or portrait to landscape), an orientation of the user as depicted in the stream of input images also changes and the user may appear "tilted" to the other participants. In some scenarios, the tablet may suddenly apply or remove a counter-rotation to the images so that the user appears to "snap" back to their original, upright orientation. In some scenarios, the user may appear to abruptly move within a frame when the orientation is snapped to the original orientation.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure are directed to improving a viewing experience for a stream of input images.

In one aspect, a method for processing a stream of input images is provided. A stream of input images that are from an image sensor is received. The stream comprises an initial sequence of input images including a subject having an initial orientation. A change in an angular orientation of the image sensor while receiving the stream of input images is determined. In response to determining the change in the angular orientation, a subsequent sequence of input images of the stream of input images is processed for rotation to counteract the change in the angular orientation of the image sensor and maintain the subject in the initial orientation. The stream of input images is transmitted to one or more display devices.

In another aspect, a method for processing a stream of input images is provided. A stream of input images from an image sensor and include a current image is received. The current image is rotated so that a subject within the current image is in a predetermined angular orientation. An output image is generated where the subject is located at a predetermined location within the output image based on the rotated current image. The output image is transmitted to one or more display devices.

In yet another aspect, a system for processing a stream of input images is provided. The system comprises an image sensor configured to capture the stream of input images, an orientation sensor configured to sense an angular orientation of the image sensor, and a stream processor. The stream comprises an initial sequence of input images including a subject having an initial orientation. The stream processor is configured to determine a change in an angular orientation of the image sensor while the stream of input images is received. The stream processor is also configured to, in response to determining the change in the angular orientation, process a subsequent sequence of input images of the stream of input images for rotation to counteract the change in the angular orientation of the image sensor and maintain the subject in the initial orientation. The stream of input images is transmitted to one or more display devices.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS/FIGURES

Non-limiting and non-exhaustive examples are described with reference to the following Figures.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems, or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

The present disclosure describes various examples of a stream processor configured to rotate images within a stream of input images. The examples provide a more consistent view of a subject within a stream of input images in scenarios where a camera module or image sensor that captures the stream of input images is rotated. For example, when a user participates in a video conferencing call using a tablet (or smartphone) to capture the stream of input images, the user may rotate the tablet to change a screen of the tablet from a landscape orientation to a portrait orientation. However, as an angular orientation of the tablet is changed while rotating from the landscape orientation to the portrait orientation, an orientation of the user as depicted in the stream of input images (i.e., transmitted to other participants) also changes and the user appears "tilted." In some scenarios, the tablet may provide a flag to indicate when the tablet has changed between portrait and landscape orientations, but this flag is generally not changed until well into the rotation, so that the user appears to rotate or tilt and then suddenly "snaps" back to an original orientation. In embodiments described herein, a computing device includes a stream processor that receives a stream of input images from an image sensor where the stream comprises an initial sequence of input images including a subject having an initial orientation. The stream processor determines a change in an angular orientation of the image sensor while receiving the stream of input images. In response to determining the change in the angular orientation, the stream processor processes a subsequent sequence of input images of the stream of input images for rotation to counteract the change in the angular orientation of the image sensor and maintain the subject in the initial orientation. The stream of input images are then sent to one or more display devices.

Figure 1:
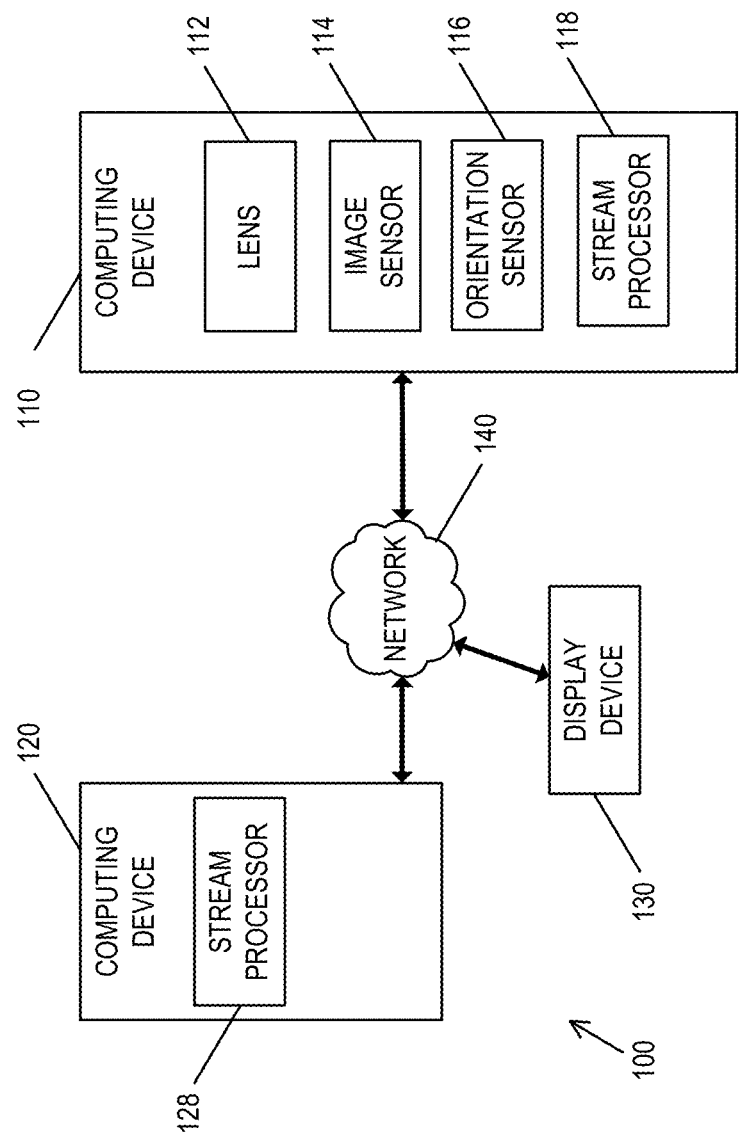
FIG. 1 shows a block diagram of an example of a communication system in which a stream processor may be implemented, according to an example embodiment.

This and many further embodiments for a computing device are described herein. For instance, FIG. 1 shows a block diagram of an example of a communication system 100 in which a stream processor 118 may be implemented by a computing device 110, according to an example embodiment. As shown in FIG. 1, communication system 100 includes the computing device 110, a computing device 120, and a display device 130. A network 140 communicatively couples the computing device 110, the computing device 120, and the display device 130.

Computing device 110 may be any type of computing device, including a mobile computer or mobile computing device (e.g., a Microsoft® Surface® device, a laptop computer, a notebook computer, a tablet computer such as an Apple iPad™, a netbook, etc.), or a stationary computing device such as a desktop computer or PC (personal computer). In some embodiments, computing device 110 is a cable set-top box, streaming video box, or console gaming device. Computing device 110 may be configured to execute one or more software applications (or "applications") and/or services and/or manage hardware resources (e.g., processors, memory, etc.), which may be utilized by users of the computing device 110.

The computing device 110 includes one or more lenses 112, one or more image sensors 114, an orientation sensor 116, and the stream processor 118. The computing device 120 is generally similar to the computing device 110, but in the embodiment shown in FIG. 1, the computing device 110 includes a stream processor 128 (similar to the stream processor 118) but omits the lens 112, image sensor 114, and orientation sensor 116. The stream processor 118 (and stream processor 128) is configured to process a subsequent sequence of input images of the stream of input images for rotation, as described herein. In other words, the stream of input images includes an initial sequence of images with a subject and a subsequent sequence of images with the subject where the subsequent sequence includes those images that have been processed to maintain the subject in a same orientation. In some scenarios, the stream of input images is received from the image sensor 114. In other scenarios, the stream of input images is received over the network 140 from another computing device. For example, the stream processor 128 of the computing device 120 may receive a stream of input images from the computing device 110 (e.g., from the image sensor 114) via the network 140. The stream of input images is then transmitted to one or more display devices 130, for example, display devices used by participants in a video call. The display devices 130 may be another computing device (e.g., mobile or stationary computing device) having a suitable display screen or a data storage medium for storing the stream of input images. In some embodiments, the display device 130 is integral with the computing device 110 and/or computing device 120.

The image sensor 114 is an image capture device, such as an image sensor within any of a digital camera (e.g., digital single lens reflex camera or mirrorless camera), webcam, smartphone camera module, tablet camera module, or other suitable camera module. Although the image sensor 114 is shown as being located within and/or fixed to the computing device 110, in some embodiments, the image sensor 114 is external to the computing device 110 and communicatively coupled by a wireless interface and/or wired interface (e.g., Bluetooth, Wi-Fi, universal serial bus, high definition multimedia interface, or other suitable interface).

In some embodiments, the image sensor 114 captures light received through a lens 112. Although only a single lens 112 is shown, the lens 112 may be a single lens, a lens system, lens stack, or other group of lenses, in various embodiments. In some embodiments, the computing device 110 includes a plurality of image sensors (similar to the image sensor 114), with each image sensor having a corresponding lens (such as the lens 112). For example, the computing device 110 may include a standard image sensor and lens, a wide-angle image sensor and lens, a front-facing image sensor and lens, a rear-facing image sensor and lens, etc. Among a plurality of image sensors within the computing device 110, the image sensors may have different aspect ratios (e.g., 16:9, 4:3, 1:1), fields of view, resolutions, or other parameters.

In some embodiments, the lens 112 introduces minimal or negligible chromatic distortion and/or spatial distortion, for example, when a high quality lens with minimal optical aberrations is used. In other embodiments, the lens 112 introduces chromatic distortion, spatial (i.e., geometric) distortion, or both chromatic and spatial distortion (e.g., due to poor manufacturing tolerances, quality control, etc.). In various embodiments, geometric distortion and/or chromatic distortion may be corrected within an image after it has been captured using mesh-based processing. For example, geometric transformation may be performed by texture mapping from a rectilinear mesh of an input image to a transformed shape of an output image. Geometric distortion may include pincushion distortion, barrel distortion, and/or other geometric distortions. Lens 112 may exhibit any type of lens distortion, including gnomonic such as f-tan(θ) or fisheye such as f-θ, and the lens distortion may have radial symmetry or be anamorphic. In some embodiments, distortion correction, or dewarp, may be used to correct the captured input image due to lens distortion. In some embodiments, the lens distortion may be constrained by lens design thus not requiring distortion correction of the captured input image.

In some embodiments, the computing device 110 (or another suitable device) generates some images of the stream of input images using a first image sensor, but generates some images of the stream of input images using a second, different image sensor. For example, the computing device 110 may switch between a wide-angle image sensor and a standard image sensor based on an angular orientation of the computing device 110 (e.g., the wide-angle image sensor for a landscape orientation and a standard image sensor for a portrait orientation). In some embodiments, the computing device 110 generates at least some images of the stream of input images using a first region of interest (ROI) from an image sensor, but generates at least some other images of the stream of input images using a second ROI from the same image sensor.

The stream of input images may be a live stream, a recorded stream, a recorded movie, or other suitable stream of input images. The stream of input images may have any suitable input size or format. In some scenarios, the stream of input images may be considered to include a current image that is currently processed by the computing device 110, one or more prior input images that have previously been processed by the computing device 110 (e.g., earlier within the stream), and one or more subsequent images that have yet to be processed (or in some cases, are yet to even arrive) at the computing device 110 and/or computing device 120. In some scenarios, the stream of input images includes an initial sequence of input images where a subject of the stream of input images is in an initial orientation (e.g., a portrait orientation) and a subsequent sequence of input images where the subject would normally be rotated away from the initial orientation (e.g., from a rotation of a image sensor or camera), but the stream processor 118 processes the images of the subsequent sequence to maintain the subject in the initial orientation. In some scenarios, the initial orientation of the subject may be different from a portrait or landscape orientation, for example, when a person (e.g., the subject) is leaning to one side or resting their head at an angle on their hand, for example. In these scenarios, the stream processor 118 processes the subsequent sequence of images to maintain the initial orientation (e.g., leaning to one side, etc.).

Images within the stream of input images may include a subject, for example, a person in a video conference feed, an object of interest (e.g., a toy or coffee mug that may be held up to a camera), or other suitable subject. In some embodiments, images within the stream of input images may contain two, three, or more subjects. For some streams, subjects may enter and leave the images, for example, a participant in a video call may get up and walk out of view of the image sensor 114.

The orientation sensor 116 is configured to provide an angular orientation of the image sensor 114. The angular orientation may be provided as a value (e.g., in degrees, radians, or other units) relative to a fixed position (e.g., relative to a horizon, relative to a vertical line, relative to a landscape orientation, relative to a portrait orientation) to indicate whether the image sensor 114 is level or at an angle with respect to the horizon. In some scenarios, the angular orientation may be based on a compound angle, for example, where the image sensor 114 is mounted on a surface of a frame (not shown) of the computing device 110 that is in a different plane from the orientation sensor 116, where a camera enclosure containing the image sensor 114 and the orientation sensor 116 is mounted at an angle tilted with respect to a display plane of the computing device 110, or where a rotation axis of the computing device 114 on or within which the camera is mounted is not contained within a horizontal plane of a scene (e.g., mounted on a sloped easel or sloped cart). The orientation sensor 116 may be a gyroscope, accelerometer, inertial measurement unit, or other suitable orientation sensor. In some embodiments, the orientation sensor 116 is a pivot angle sensor that determines a pivot angle for the image sensor 114 (or a pivot angle for a camera or camera module containing the image sensor 114) that is mounted to a fixed pivot point, for example, when the image sensor 114 is mounted on a wall or stand in a conference room. In some embodiments, the orientation sensor 116 filters or smooths the provided angular orientation, for example, by averaging or weighting the values. Filtering the output reduces a likelihood that unsteady holding or rotating of the computing device 110 will cause sudden directional changes in rotation applied to the stream of input image (e.g., switching between counter-clockwise rotation and clockwise rotation intermittently as the computing device 110 is rotated).

The stream processor 118 is configured to receive a stream of input images (e.g., from image sensor 114) and process the stream of input images to improve a rotational transition. In some scenarios, the rotational transition is from a first orientation to a second orientation, for example, from a landscape orientation (i.e., 0° relative to the horizon) to a portrait orientation (i.e., 90° relative to the horizon). As described above, such a transition may occur when a participant within a video call rotates a tablet from landscape to portrait orientation, or vice versa. The stream processor 118 may be implemented as a specialized processor (e.g., an application specific integrated circuit), a general purpose processor configured with an application or other suitable instructions, or other suitable processor, in various embodiments.

As described above, the computing device 120 is similar to the computing device 110. In some embodiments, however, the computing device 120 is a cloud computing device or network server that processes a stream of input images (e.g., from the computing device 110) and then transmits the processed stream of input images to one or more display devices 130, used by participants in a video call, for example.

Network 140 may comprise one or more networks such as local area networks (LANs), wide area networks (WANs), enterprise networks, the Internet, etc., and may include one or more of wired and/or wireless portions. Computing device 110 and computing device 120 may include at least one wired or wireless network interface that enables communication with each other or an intermediate device via network 140. Examples of such a network interface include but are not limited to an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, or a near field communication (NFC) interface. Examples of network 140 include a local area network (LAN), a wide area network (WAN), a personal area network (PAN), the Internet, and/or any combination thereof.

As used herein, the terms "input image" and "output image" include, but are not limited to images, video data (e.g., stills or frames of a video or streaming content), or other suitable image data. For example, images may include JPEG images, GIF images, BMP images, PNG images, RAW images, or other suitable image file formats.

Figure 2:
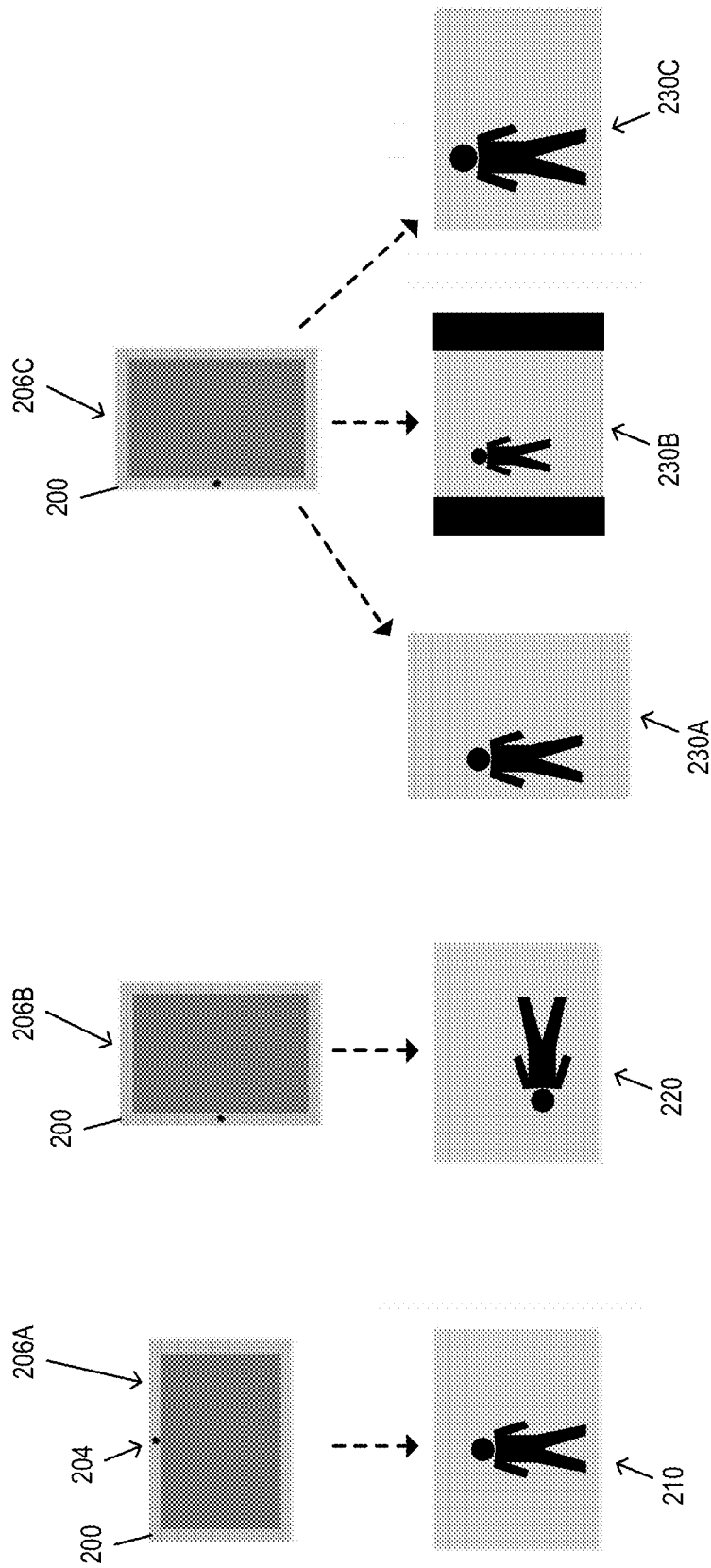
FIG. 2 shows diagrams of example angular orientations of a computing device and corresponding output images, according to an embodiment.

FIG. 2 shows diagrams of example angular orientations of a computing device 200 and corresponding output images, according to an embodiment. The computing device 200 includes an image sensor 204 and an orientation sensor (not shown) and is configured to toggle an output image between a landscape orientation and a portrait orientation based on the orientation sensor. In FIG. 2, the computing device 200 is shown transitioning from a horizontal orientation (206A) to a vertical orientation (206B, 206C), for example, as a result of being rotated by a user of the computing device 200. The image sensor 204 provides an output image as part of a stream of input images, shown as i) image 210, at a first stage before the transition, ii) image 220, at a second stage after the transition but before an image orientation correction has been made, and iii) images 230A, 230B, and 230C as alternative images, at a third stage after the transition and after an image orientation correction has been made. In some scenarios, the orientation sensor of the computing device 200 does not immediately indicate that the computing device 200 has rotated (e.g., due to processing delays or lack of sensitivity), or the computing device 200 delays changing from the landscape orientation, for example, by filtering an output of the orientation sensor to ensure that the user wishes to change the orientation and has not simply "bumped" the computing device 200.

During the first stage with the horizontal orientation 206A, the image 210 has a landscape orientation and includes a subject (e.g., the user) that is vertically oriented and centered within the image 210, using a full field of view of the image sensor 204. As the user rotates the computing device 200 to the vertical orientation 206B, the image sensor 204 is also rotated and no longer located on a center line of the computing device 200 (the second stage). At the vertical orientation 206B, the image 220 is still provided as a "landscape" image, but the subject has been rotated 90° and is now on a bottom portion of the image 220. In other words, during this second stage, the subject appears "sideways" and the image 220 represents an inconsistent view of the subject. Although only the image 220 is shown to represent the second stage, in some scenarios, the stream of input images includes many images where the subject and content of the stream of input images appears to be gradually rotated from the vertical orientation to a sideways orientation.

As the user rotates the computing device 200, the orientation sensor may provide an indication of the rotation to the image sensor 204 and the image sensor 204 may suddenly change from a landscape to portrait orientation and "snap" the image to the portrait orientation. After receiving an indication of the change in orientation from the orientation sensor, the computing device 200 may provide a rotated image 230, in various embodiments. In one embodiment, the computing device 200 provides image 230A, where the image from the image sensor 204 is rotated by 90°, preserving the field of view of the image sensor 204, but changing the aspect ratio and relocating the subject to a left side of the image 230A. In another embodiment, the computing device 200 provides image 230B, where the image from the image sensor 204 is rotated by 90°, but the image is processed to be padded with "side bars" (e.g., "pillarboxing") or "horizontal bars" (e.g., "letterboxing") to fill out the field of view. In image 230B, the subject is also relocated to a left side of the image 230A, rather than being centered as in the image 210. In yet another embodiment, the computing device 200 provides image 230C, where the image from the image sensor is rotated by 90° and the image is enlarged (zoomed in) and/or cropped to preserve the aspect ratio, with the subject relocated to a left side of the image 230A.

After the user has completed rotation of the computing device 200, the subject and content of the stream of input images has shifted within the images due to the change in position and orientation of the image sensor 204 and any cropping which may be applied. Generally, even if the image sensor 204 were kept perfectly level during the rotation of the computing device 200, a person viewing the stream of input images would be able to clearly discern that a device rotation has occurred, because an overall composition of a scene within the stream of input images would change as a result of the rotation (e.g., shifting the subject to the left).

Figure 3:
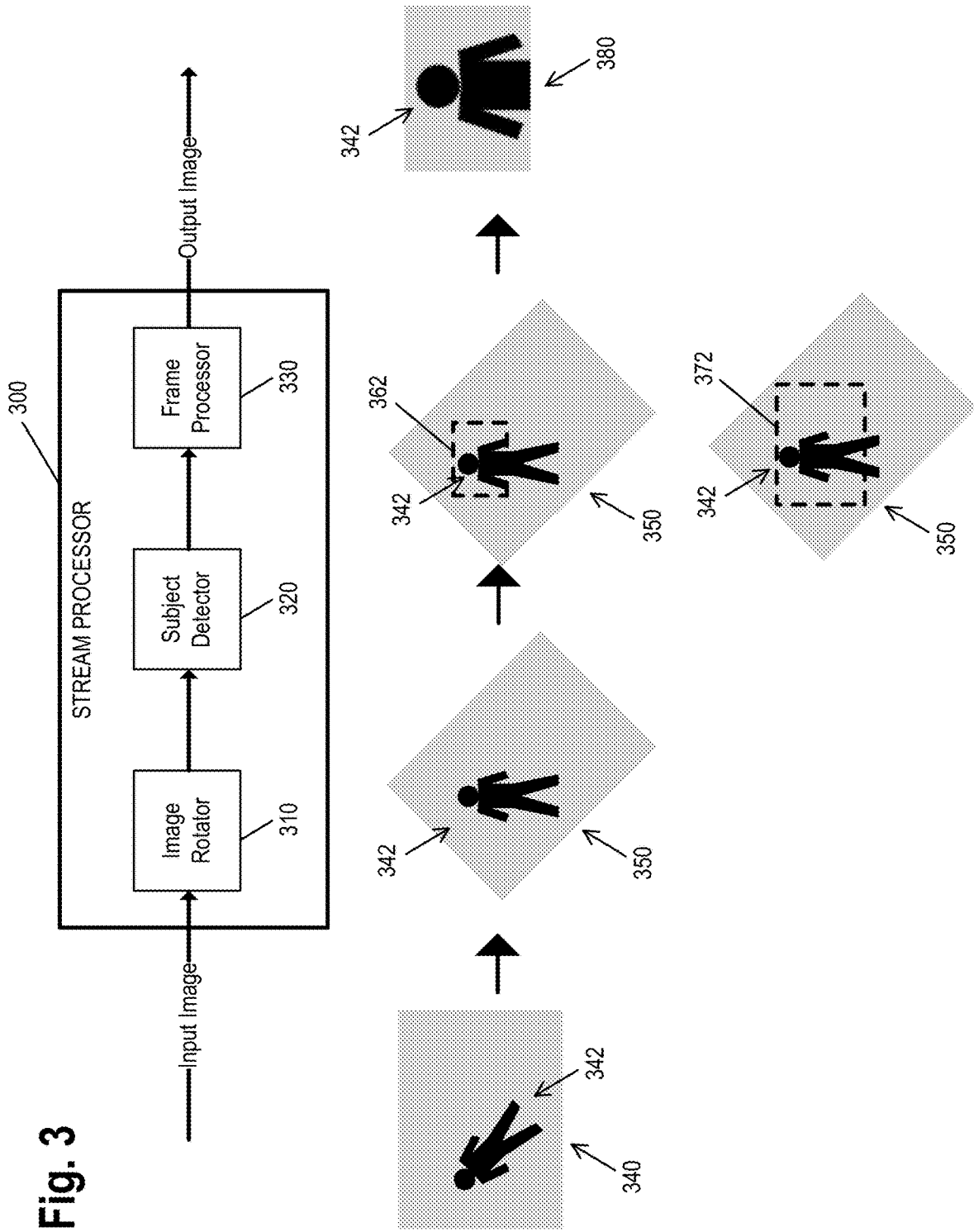
FIG. 3 shows a diagram of an example stream processor and example intermediate images, according to an example embodiment.

FIG. 3 shows a diagram of an example stream processor 300 and example intermediate images, according to an example embodiment. The stream processor 300 generally corresponds to the stream processor 118 and/or 128, in various embodiments. The stream processor 300 is configured to correct for the "snap" and shifting of the subject within a stream of input images when an angular orientation of an image sensor is changed while receiving (e.g., during) the stream of input images. In other words, the stream processor 300 improves a stream of input images that would otherwise appear as shown in FIG. 2. The stream processor 300 is configured to perform this correction by detecting subjects (e.g., humans) and their locations within the stream of input images and, in some scenarios, center them by zooming or cropping on a near real-time basis. This correction may be performed before, during, and after the device rotation (e.g., during the first stage, second stage, and third stage described above), thereby reducing or eliminating the sideways shift of the subject within the image and/or the change of field of view as a result of the rotation. Accordingly, as represented by a viewer of the stream of input images, the device rotation happens generally seamlessly, with a reduction or elimination of conventional video effects associated with device rotation, as described above.

The stream processor 300 includes an image rotator 310, a subject detector 320, and a frame processor 330. FIG. 3 also shows an input image 340 having a subject 342 from a stream of input images, before the input image 340 has been processed by the stream processor 300. After processing, the stream processor 300 provides an output image 380. The image 340 may be received from an image sensor (e.g., image sensor 114), a memory of the computing device 110 or 120, or via the network 140. The image 340 has a single subject 242 (a person), but may have additional subjects in other embodiments and/or scenarios.

The image rotator 310 is configured to automatically rotate the input image 340, in various embodiments, to a selected angle so that the subject 342 is in an "upright" orientation where the input image 340 is "level." In one embodiment, the image rotator 310 rotates the input image 340 based on a rotation angle received from an orientation sensor, such as the orientation sensor 116. In another embodiment, such as the computing device 120 where an orientation sensor is omitted, the image rotator 310 rotates the input image 340 based on a rotation angle from a subject detector, as described below. After rotating the input image 340, the image rotator 310 may provide an intermediate image 350 to the subject detector 320. In other embodiments, the image rotator 310 may modify the input image 340 directly in a memory and provide an address or pointer to the modified image as the intermediate image 350.

As described above, the lens 112 may introduce distortion to a captured image, which may be corrected by mesh-based processing. A polygon mesh is a collection of vertices, edges, and/or faces that defines a shape of a polyhedral object. The image rotator 310 may be configured to apply a mesh to an input image by mapping pixels from the input image to a corresponding location in an output image using the mesh. In other words, the mesh provides a mapping of x, y coordinates of the input image to x, y coordinates of the output image.

For instances of the image sensor 114 which do not use mesh-based distortion correction (e.g., distortion governed by the lens 112), the image rotator 310 performs a simple rotation of the input image using a geometric transformation or interpolation approach. For instances of the image sensor 114 which use a rotationally symmetric mesh for distortion correction, the same geometric transformation may be applied, after application of the mesh-based distortion correction.

For instances of the image sensor 114 which use a non-symmetric mesh for distortion correction (e.g., a mesh which has been designed to account for the geometry and/or orientation of a scene relative to the orientation/pointing of the image sensor 114), the meshes are adjusted appropriately as a function of the angular orientation of the image sensor 114. Adjustment of the mesh may be performed using several different approaches. Another example of non-symmetric mesh for distortion correction includes correction of anamorphic images, where the lens distortion is not radially symmetric. In this case, compensation of rotation of the image sensor 114 (or corresponding camera module) relative to the captured scene may include correction of the anamorphic distortion alone or a combination of correction of both anamorphic distortion and orientation of scene geometry relative to an orientation and/or pointing direction of the image sensor 114.

In one embodiment, the image rotator 310 includes a set of discrete meshes corresponding to a known angular sweep of the image sensor 114. For example, an angular sweep of 360° may be divided up into a set of 180 meshes at 2° intervals, a set of 360 meshes at 1° intervals, or other suitable divisions. The set of discrete meshes may be based on a fixed reference orientation, such as a landscape orientation (0° relative to the horizon) or portrait orientation (90° relative to the horizon), so that when a change in angular orientation occurs, a difference between a first, or initial, orientation (e.g., the fixed reference orientation) and a second orientation (e.g., a current angular orientation) identifies a mesh within the set of discrete meshes. The image rotator 310 determines an amount of rotation for the input image to be rotated (e.g., a difference between a first orientation and a second orientation) and selects a corresponding mesh, or a mesh that is closest to the determined amount of rotation (e.g., by rounding the amount of rotation to a nearest interval). The image rotator 310 then applies the selected mesh to the input image 340 to obtain the intermediate image 350. Although this approach may require less processing as compared to other approaches described below, additional memory storage is required to store a larger number of meshes.

In another embodiment, the image rotator 310 performs interpolation among a set of discrete meshes corresponding to known orientations of the image sensor 114. For example, the set of meshes may include eight meshes corresponding to orientations at 0° (e.g., landscape orientation), 45°, 90°, 135°, 180°, 225°, 270°, and 315°. The image rotator 310 interpolates between two adjacent meshes to generate an intermediate mesh, for example, interpolating between the 0° mesh and 45° mesh to generate an intermediate mesh corresponding to 32°. The image rotator 310 then applies the intermediate mesh to the input image 340 to obtain the intermediate image 350. In this approach, fewer meshes are stored, which reduces memory storage requirements, but additional processing time or performance is required to generate the intermediate mesh. In some embodiments, the image rotator 310 retains the intermediate mesh corresponding to 32° for further interpolation, for example, interpolating between the intermediate mesh corresponding to 32° and the discrete mesh corresponding to 45° to obtain another intermediate mesh at 38.5°.

In yet another embodiment, the image rotator 310 rotates and/or resamples the input image 340 prior to applying a selected mesh. For example, the image rotator 310 may perform a simple geometric rotation of the input image 340 to orient the input image 340 to one of the eight meshes described above (0°, 45°, etc.) and then apply the corresponding mesh to obtain the intermediate image 350. As another example, the image rotator 310 may perform the geometric rotation on the one of the eight meshes and then apply this adjusted mesh to the input image 340. These approaches may provide improved image quality, but at a higher cost in processing time and/or performance.

In still other embodiments, the image rotator 310 may use more complex interpolation schemes that correct for movement of the image sensor 114. For example, the image rotator 310 may correct for barrel distortion, pincushion distortion, rotation distortion, shear distortion, perspective distortion, wave distortion, and/or camera pointing angle.

The subject detector 320 is configured to identify subjects within a field of view of the intermediate image 350, or directly within the field of view of the input image 340. In various embodiments, the subject detector 320 may use one or more neural network models (not shown) to detect faces, an upper body of a person, or other objects as subjects of the intermediate image 350. After detection, the subject detector 320 may provide a frame, such as a frame 362, that identifies a detected subject or a region of the intermediate image 350 where the subject is present. In embodiments where multiple subjects are detected by the subject detector 320, a single frame may be enlarged to include each of the multiple subjects, or alternatively, multiple frames may be provided with each frame including one or more subjects. In some embodiments, the frame 362 is sized to generally outline a head and shoulders of the subject 342. In other embodiments, a frame 372 is sized with a predetermined aspect ratio (e.g., 16:9 or 4:3) and is selected to be as large as possible while still fitting within the bounds of the intermediate image 350.

Generally, the frame 362 or 372 is a bounding box having a rectangular shape, square shape, or other suitable shape. In some embodiments, the shape of the frame 362 or 372 is selected to match a desired aspect ratio of the output image 380. The subject detector 320 may dynamically resize frame 362 or 372 to change aspect ratios, in some scenarios. For example, the subject detector 320 may smoothly change the aspect ratio of the frame 362 from a 16:9 aspect ratio to a 4:3 aspect ratio when a rotation from a landscape orientation to a portrait orientation is performed.

In some embodiments, the subject detector 320 includes an object classifier that recognizes and/or identifies one or more objects within the input image. In some embodiments, the subject detector 320 is configured to track faces and includes a facial recognition device, facial tracking device, or body tracking device (not shown). The subject detector 320 may also be configured to identify landmarks within a subject, in some embodiments. Examples of the landmarks may include eyes, nose, eyebrows, mouth, ears, lower face, etc. when the subject is a face or person.

The frame processor 330 is configured to position the subject 342 of the intermediate image 350 at a predetermined location within the output image 380. The predetermined location may be a centered location within the output image 380, or another suitable location. In some embodiments, a user may select the predetermined location, for example, when they are presenting an object such as a product prototype during a presentation, they may hold the product prototype to their left and wish for their face to be shown on the left side of the output image so that the product prototype may also be included within the output image 380. In some embodiments, the frame processor 330 crops the intermediate image 350 according to the frame 362 or 372. In other embodiments, the frame processor 330 zooms in on the frame 362 or 372 to provide the output image 380. The frame processor 330 may be configured to process the intermediate image 350 based at least in part on previous images within the stream of input images, for example, to filter and smooth any appearance of movement or zooming as the image sensor 114 is rotated.

In some embodiments, the subject detector 320 sizes the frame 362 where the frame 362 extends outside of an effective "edge" of the image sensor 114, for example, to provide a particular aspect ratio of the frame 362 while maintaining a subject (or multiple subjects) within the output image 380 or while providing a minimum image size. In this embodiment, the frame processor 330 may fill portions of the output image 380 that would be outside of the image sensor 114 with a static image or pattern, a dynamic image such as a blurred image portion based on content within the intermediate image 350, letterboxing effect, or pillarboxing effect.

Although the images 340, 350, and 380 have been described as separate images, in some embodiments, at least some of the images are manipulated in memory without creating a copy.

In some embodiments, the image rotator 310 is implemented after the frame processor 330. In this embodiment, the image rotator 310 may have a smaller image to process (i.e. a cropped image from the frame processor 330). The subject detector 320 may be configured to identify subjects, such as faces and/or upper bodies, and estimate the angular orientation of the image based on features of the identified subjects. For example, the subject detector 320 may identify a face and estimate the angular orientation based on relative positions of the eyes, nose, mouth, or other "landmarks" of the face. In one such example, the subject detector 320 determines an angle which results in the eyes of the face being at a same height and located above the nose and mouth.

Figure 4:
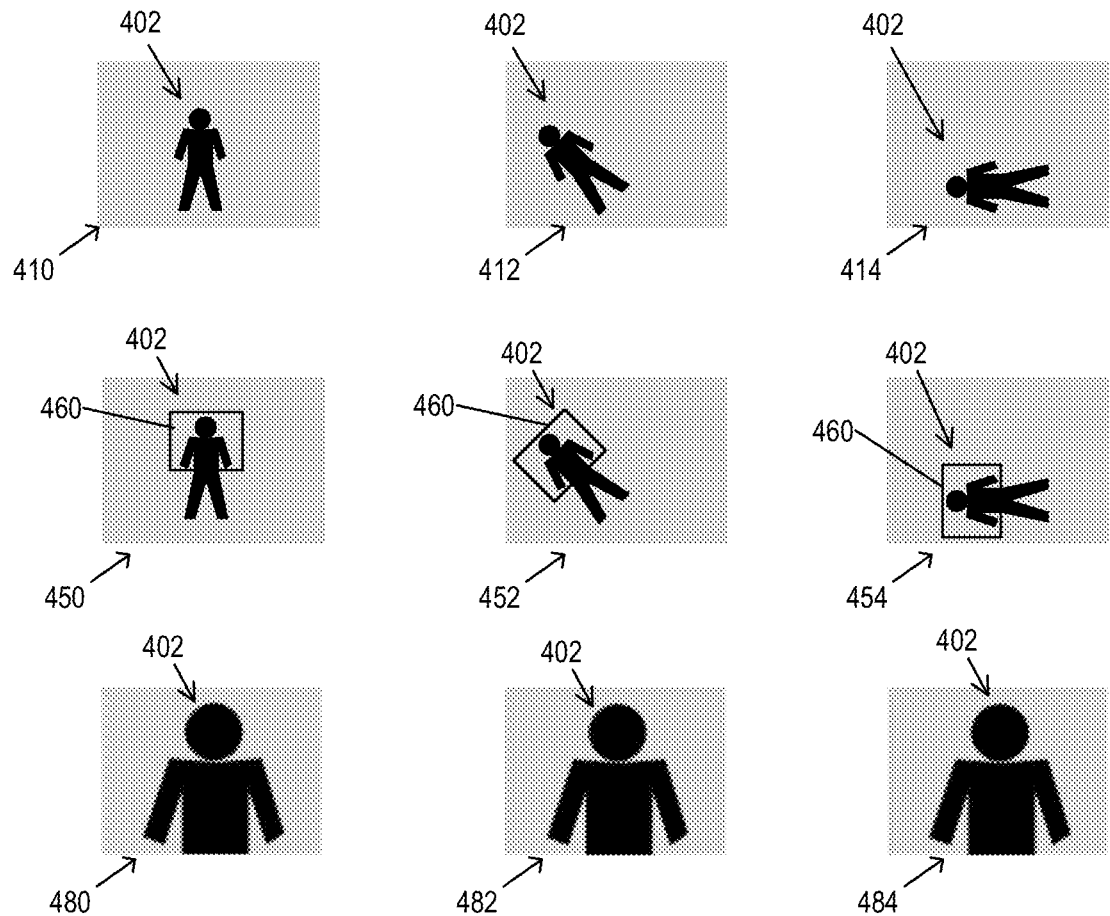
FIG. 4 shows diagrams of example images from perspectives of an image sensor, a frame processor, and a user, according to an embodiment.

FIG. 4 shows diagrams of example images from perspectives of an image sensor (e.g. image sensor 114), a frame processor (e.g., frame processor 330), and a user viewing output images (e.g., output images 380), according to an embodiment. Input images 410, 412, and 414 are provided by the image sensor 114 and generally correspond to the input image 340 as the image sensor 114 is rotated from a vertical orientation, to a partially rotated orientation, to a horizontal orientation, respectively. The input images 410, 412, and 414 include a subject 402. Intermediate images 450, 452, and 454 are provided to the frame processor 330 and generally correspond to intermediate image 350 as the image sensor 114 is rotated from a vertical orientation, to a partially rotated orientation, to a horizontal orientation, respectively. The intermediate images 450, 452, and 454 include the subject 402 and a frame 460. Output images 480, 482, and 484 are provided by the frame processor 330 and generally correspond to the output image 380 as the image sensor 114 is rotated from a vertical orientation, to a partially rotated orientation, to a horizontal orientation, respectively. As shown in FIG. 4, the output images 480, 482, and 484 do not have a sideways shift of the subject 402 and/or a change of field of view as a result of the change in orientation. The input image 410 may be considered to be part of an initial sequence of images, while the input images 412 and 414 may be considered to be part of a subsequent sequence of images (e.g., those images processed to maintain a subject in a same orientation).

Figure 5:
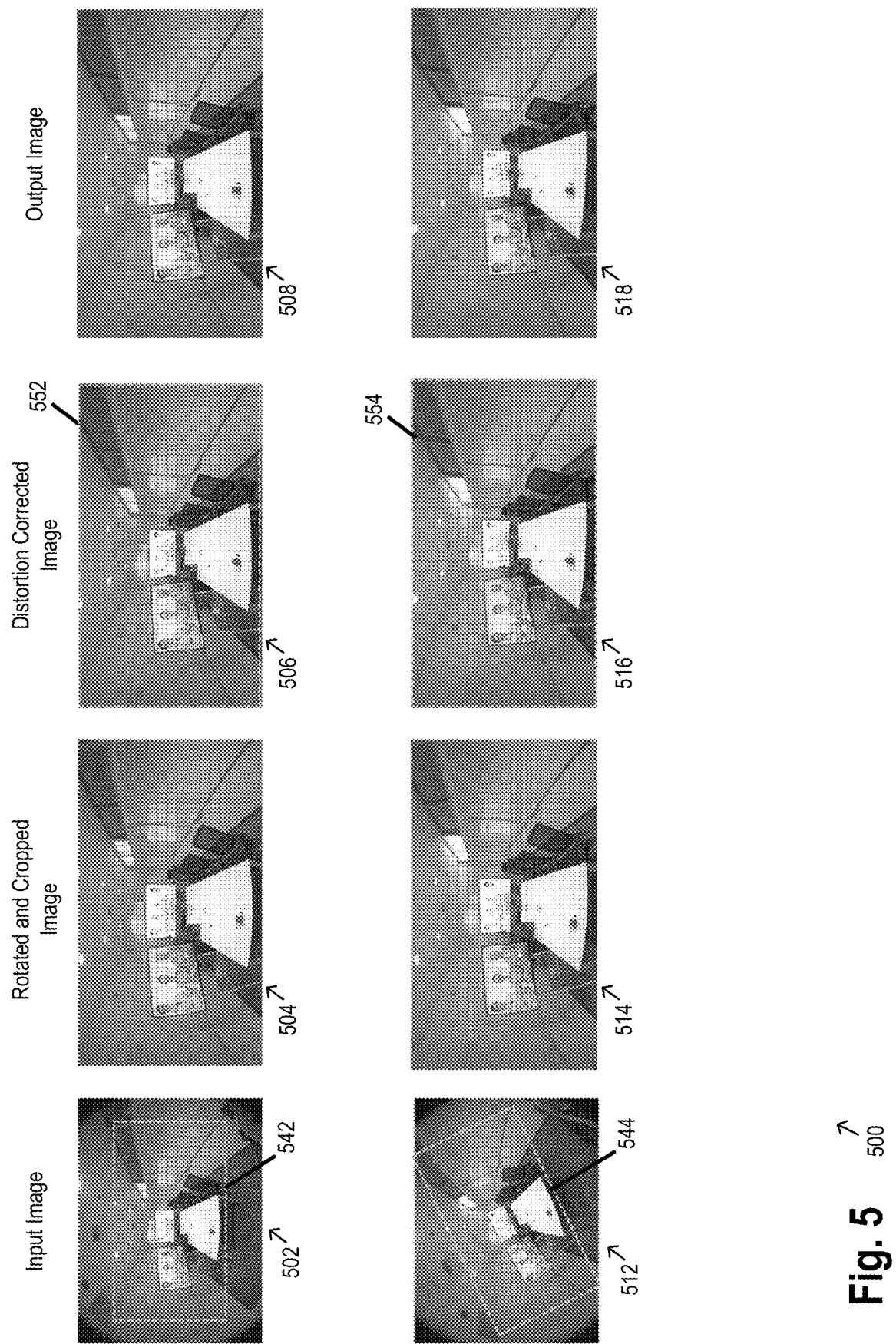
FIG. 5 and FIG. 6 show diagrams of diagrams of example images from an image sensor and a stream processor, according to an embodiment.
Figure 6:
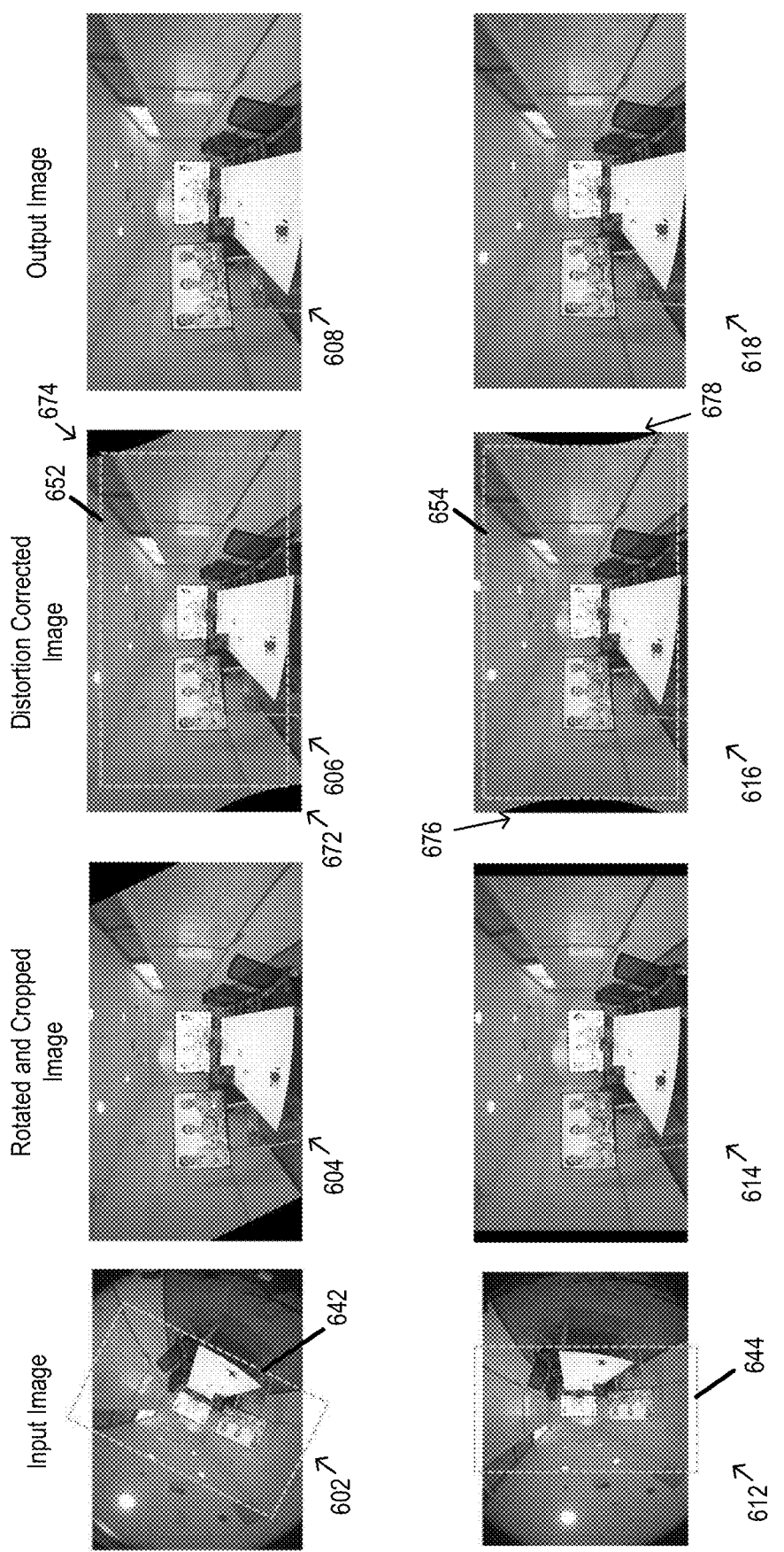

FIG. 5 and FIG. 6 show diagrams of example images from an image sensor (e.g., image sensor 114) and a stream processor (e.g., stream processor 300), according to an embodiment. The example images include input images 502, 512, 602, and 612, rotated and cropped images 504, 514, 604, and 614, distortion corrected images 506, 516, 606, and 616, and output images 508, 518, 608, and 618. The input images 502, 512, 602, and 612 correspond to angular orientations of the image sensor 114 of 0° (e.g., a landscape orientation), 26°, 64°, and 90° (e.g., a portrait orientation).

The input images 502, 512, 602, and 612 may be captured by an oversized image sensor, for example, the image sensor 114 where a sensor resolution is larger than an image crop resolution in at least one dimension. For example, the image sensor 114 may have a sensor resolution of 4000×3000 for input images and thus be capable of providing an input image of 4000×3000, but the image rotator 310 (or frame processor 330) is configured to crop images to an image crop resolution of 3840×2160. This approach allows for rotation of the input images with a reduced change in field of view to obtain a consistent aspect ratio (e.g., a 16:9 aspect ratio for landscape orientation, 4:3 aspect ratio for portrait orientation) for the output image. In FIGS. 5 and 6, image crop regions 542, 544, 642, and 644 correspond to the image crop resolution of 3840×2160 on the input images 502, 512, 602, and 612, respectively. Further, the image sensor 114 may be oversized compared to any cropped resolutions, to such extent that output image FOV is maintained, and no cropping is required, for all rotation correction angles (or most rotation correction angles, such as for a sensor resolution of 4000×4000 and an image crop resolution of 3840×2160).

Rotated and cropped images 504, 514, 604, and 614 correspond to the input images 502, 512, 602, and 612, respectively, after rotation has been performed (e.g., by image rotator 310) and cropping has been performed (e.g., by the image rotator 310 or frame processor 330). As shown in FIG. 5, the oversized image sensor 114 allows for a same field of view between the input images 502 and 512 and rotated and cropped images 504 and 514, respectively. As shown in FIG. 6, however, the image crop region 642 extends past an edge of the input image 602 and the corresponding rotated and cropped image 604 has null values (e.g., "black bars") where no image data is present within the image crop region 642. Similarly, the image crop region 644 extends past an edge of the input image 612 and the corresponding rotated and cropped image 604 has null values within the image crop region 644. In some scenarios, a frame processor, such as the frame processor 330, fills in the null values with a static image or pattern, a dynamic image, pillarboxing effect, or letterboxing effect.

A frame processor, such as the frame processor 330, performs distortion correction (e.g., dewarping) on the rotated and cropped images 504, 514, 604, and 614 to obtain distortion corrected images 506, 516, 606, and 616, in various embodiments. Examples of the distortion correction may include radially symmetric distortion corrections including rectilinear analytical projection and spherical analytical projection, or alternatively may include non-radially symmetric distortion corrections including cylindrical analytical projection, parabolic analytical projection, super-Gaussian analytical projection, or any other distortion correction using direct or indirect analytical projection, or further any distortion correction using direct or indirect analytical projection which may include a zoom amplitude function, a pitch compensation or a pixel offset, including rectilinear analytical projection having a zoom amplitude function, or other suitable distortion correction techniques.

The frame processor 330 may further crop the distortion corrected images 506, 516, 606, and 616 to provide corresponding output images 508, 518, 608, and 618 which omit the null values (black bars) while maintaining a same aspect ratio, in some scenarios. In the distortion corrected images 506 and 516, null values are not present and image crop regions 552 and 554 include the entirety of the corresponding distortion corrected images 506 and 516. However, null values are present in null regions 672 and 674 of the distortion corrected image 606 and null regions 676 and 678 of the distortion corrected image 616. Accordingly, image crop regions 652 and 654 comprise only a portion of the corresponding distortion corrected image and resulting output images 608 and 618 have a reduced field of view. Whether a subsequent cropping after distortion correction has been performed depends upon an aspect ratio of the image sensor 114 and a desired output field of view for each rotation angle. In some scenarios, cropping of the distortion corrected image may be unnecessary, for example, when the desired field of view for the output image may be provided directly from the distortion corrected image, as shown in output images 508 and 518.

In the embodiments described with respect to FIG. 5 and FIG. 6, the stream processor 300 is configured to apply the distortion correction (via frame processor 330) after image rotation compensation (by image rotator 310) using non-radially symmetric distortion correction. In other embodiments that correct for distortion having radial symmetry, the stream processor 300 may be configured to apply distortion correction prior to image rotation compensation and cropping, or to apply distortion correction prior to cropping but after image rotation compensation.

Figure 7:
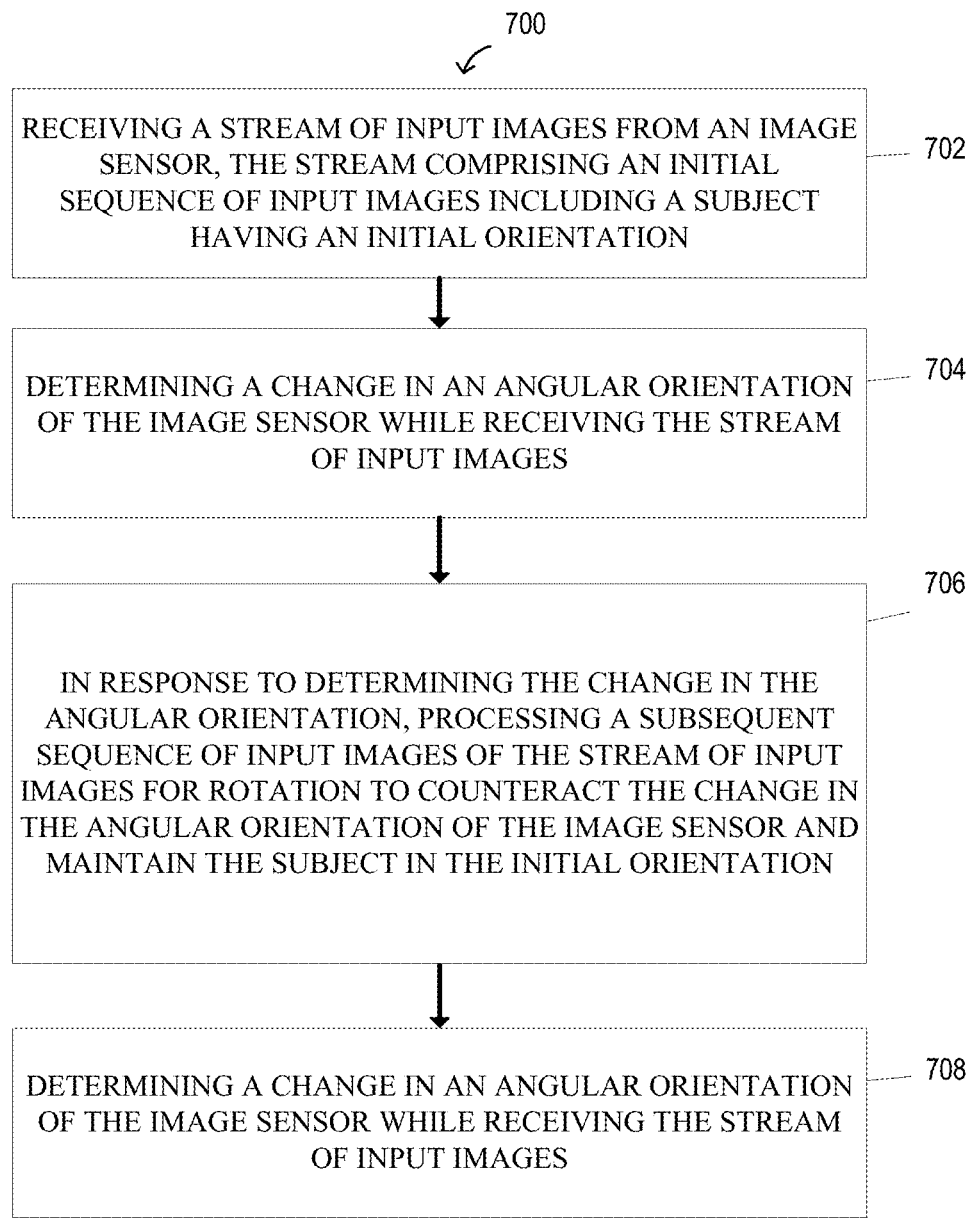
FIG. 7 shows a flowchart of an example method of processing a stream of input images, according to an example embodiment.

FIG. 7 shows a flowchart of an example method 700 of processing a stream of input images, according to an example embodiment. Technical processes shown in these figures will be performed automatically unless otherwise indicated. In any given embodiment, some steps of a process may be repeated, perhaps with different parameters or data to operate on. Steps in an embodiment may also be performed in a different order than the top-to-bottom order that is laid out in FIG. 7. Steps may be performed serially, in a partially overlapping manner, or fully in parallel. Thus, the order in which steps of method 700 are performed may vary from one performance to the process of another performance of the process. Steps may also be omitted, combined, renamed, regrouped, be performed on one or more machines, or otherwise depart from the illustrated flow, provided that the process performed is operable and conforms to at least one claim. The steps of FIG. 7 may be performed by the computing device 110 (e.g., via the stream processor 118, the stream processor 300), or other suitable computing device.

Method 700 begins with step 702. At step 702, a stream of input images from an image sensor is received. The stream comprises an initial sequence of input images including a subject having an initial orientation. The image sensor may correspond to the image sensor 114 and the stream of input images may correspond to images 410, 412, and 414 and the initial sequence of images may correspond to image 410, for example. The stream of input images may be received by the stream processor 118 or the stream processor 128, in various embodiments.

At step 704, a change in an angular orientation of the image sensor while receiving the stream of input images is determined. In an embodiment, the orientation sensor 116 determines the change in the angular orientation (or a current angular orientation) of the image sensor 114, for example, from a landscape orientation to a portrait orientation, and provides the angular orientation (or a current angular orientation) to the stream processor 118. In another embodiment, the subject detector 320 (e.g., of the stream processor 128) determines the change in the angular orientation of the image sensor 114, as described above. In some scenarios, the orientation sensor 116 filters the angular orientation with a smoothing filter. In an embodiment, the initial orientation is fixed, for example, as a reference point, and is one of a portrait orientation and a landscape orientation.

At step 706, in response to determining the change in the angular orientation, a subsequent sequence of input images of the stream of input images is processed for rotation to counteract the change in the angular orientation of the image sensor and maintain the subject in the initial orientation. The subsequent sequence of images may correspond to input images 412 and 414, for example, which are processed to provide images 482 and 484.

At step 708, the stream of input images is transmitted to one or more display devices. For example, the stream of input images is transmitted to the display device 130.

In some embodiments, the method 700 includes tracking the subject through the stream of input images using a subject detector, such as the subject detector 320. The subject detector 320 may determine that the angular orientation is changing by estimating the angular orientation based on relative positions of the eyes, nose, mouth, or other "landmarks" of the face.

In an embodiment, the method 700 includes determining a bounding box for the subject within a current image of the stream of input images using a subject detector, such as the subject detector 320. The current image may then be processed to center the subject by cropping according to the bounding box, for example, by the frame processor 330.

In some embodiments, the method 700 further includes processing the current image to fill in at least a portion of an image crop region when the image crop region extends past an edge of the image sensor. For example, the frame processor 330 may fill in the image crop region 642 or 644 with a static image or pattern, a dynamic image, pillarboxing effect, or letterboxing effect, as described above.

In some embodiments, a lens (e.g., lens 112) associated with capturing the stream of input images has lens distortion which is rotationally symmetric with respect to geometry of captured images. Processing the subsequent sequence of input images may include performing a geometric transformation of a current image of the stream of input images based on the change in angular orientation. In other embodiments, the lens associated with capturing the stream of input images causes, in captured images, geometric distortion that is correctable by a mesh that is rotationally symmetric. In this embodiment, processing the subsequent sequence of input images may include performing a geometric transformation of a current image of the stream of input images based on the change in angular orientation.

In some embodiments, a lens (e.g., lens 112) associated with capturing the stream of input images causes, in captured images, geometric distortion that is correctable by a mesh that is i) applicable to the captured images, and ii) not rotationally symmetric. In these embodiments, processing the subsequent sequence of input images includes adjusting the mesh based on the change in angular orientation of the image sensor.

In an embodiment, adjusting the mesh includes interpolating, based on the change in angular orientation, among a plurality of discrete meshes that correspond to the lens and correct the geometric distortion. The plurality of discrete meshes may correspond to the set of meshes including meshes at 0°, 45°, 90°, etc., as described above. In some embodiments, processing the subsequent sequence of input images includes, after adjusting the mesh, applying the adjusted mesh to a current image of the stream of input images. In another embodiment, adjusting the mesh includes rotating the mesh based on the change in angular orientation of the image sensor and processing the subsequent sequence of input images of the stream of input images comprises applying the rotated mesh to a current image of the stream of input images.

In yet another embodiment, a lens (e.g., lens 112) associated with capturing the stream of input images causes, in captured images, geometric distortion that is correctable by a mesh that is i) applicable to the captured images, and ii) not rotationally symmetric. The method 700 may include selecting a mesh from a plurality of discrete meshes based on the change in angular orientation of the image sensor, where each mesh of the plurality of discrete meshes is configured for a different angular orientation of the image sensor. The method 700 may further include applying the selected mesh to a current image of the stream of input images. In this embodiment, the plurality of discrete meshes may correspond to the set of 180 meshes at 2° intervals, the set of 360 meshes at 1° intervals, or sets with other suitable divisions, as described above. Further, in another embodiment, the correction mesh may be generated in real time based on a current angular orientation of the image sensor 114, however the computational requirements for this method may be increased as compared to use of a predetermined set of correction meshes.

Figure 8:
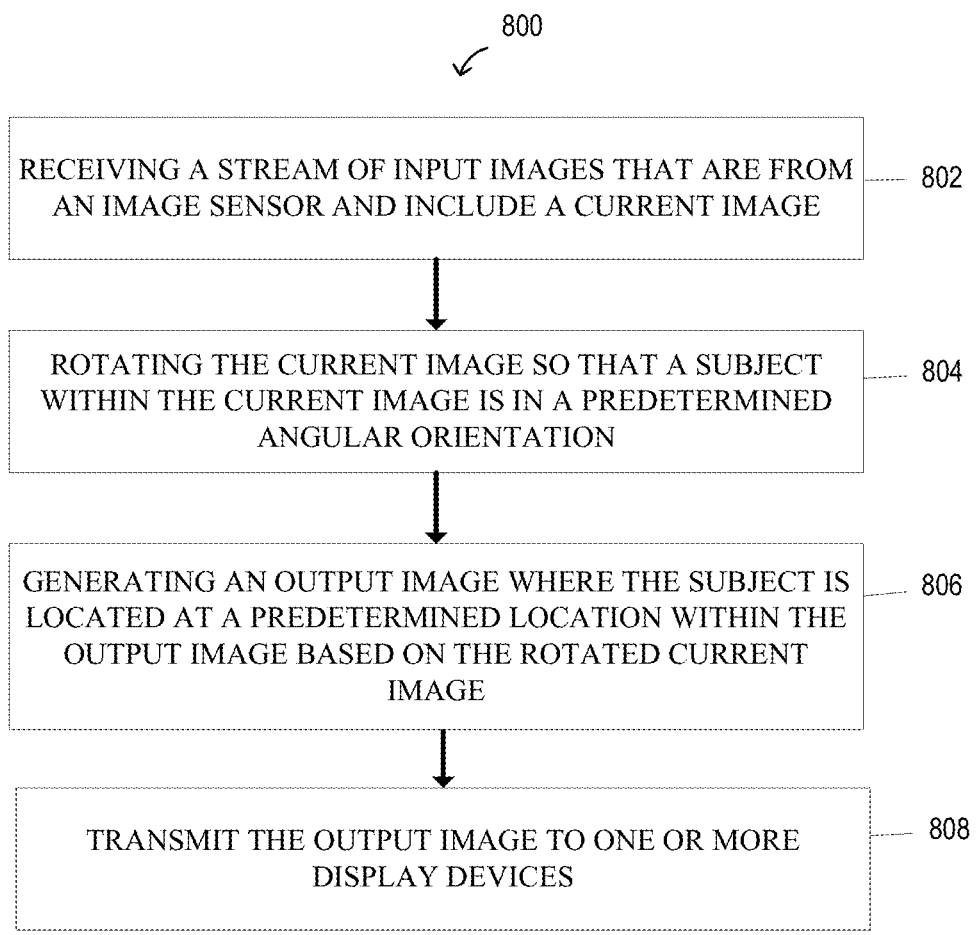
FIG. 8 shows a flowchart of another example method of processing a stream of input images, according to an example embodiment.

FIG. 8 shows a flowchart of an example method 800 of processing a stream of input images, according to an example embodiment. Technical processes shown in these figures will be performed automatically unless otherwise indicated. In any given embodiment, some steps of a process may be repeated, perhaps with different parameters or data to operate on. Steps in an embodiment may also be performed in a different order than the top-to-bottom order that is laid out in FIG. 8. Steps may be performed serially, in a partially overlapping manner, or fully in parallel. Thus, the order in which steps of method 800 are performed may vary from one performance to the process of another performance of the process. Steps may also be omitted, combined, renamed, regrouped, be performed on one or more machines, or otherwise depart from the illustrated flow, provided that the process performed is operable and conforms to at least one claim. The steps of FIG. 8 may be performed by the computing device 110 (e.g., via the stream processor 118, the stream processor 300), or other suitable computing device.

Method 800 begins with step 802. At step 802, a stream of input images from an image sensor is received. The stream of input images include a current image and the stream of input images may correspond to images 410, 412, and 414, for example.

At step 804, the current image is rotated so that a subject within the current image is in a predetermined angular orientation. In an embodiment, for example, the image rotator 310 rotates the input image 340 to generate the intermediate image 350.

At step 806, an output image is generated where the subject is located at a predetermined location within the output image based on the rotated current image. In an embodiment, for example, the frame processor 330 generates the output image 380 based on the intermediate image 350.

At step 808, the output image is transmitted to one or more display devices.

In some embodiments, a lens (e.g., lens 112) associated with capturing the stream of input images causes, in captured images, geometric distortion that is correctable by a mesh that is i) applicable to the captured images, and ii) not rotationally symmetric. In one such embodiment, generating the output image may include generating a mesh by interpolating among a plurality of discrete meshes that corresponds to the lens, each of the plurality of discrete meshes corresponding to different angular orientations of the image sensor and being configured to correct the geometric distortion, and applying the generated mesh to the current image of the stream of input images. For example, the image rotator 310 may interpolate among the meshes at 0°, 45°, 90°, etc., as described above. In another embodiment, generating the output image includes selecting a mesh from a plurality of discrete meshes based on a current angular orientation of the image sensor, each mesh of the plurality of discrete meshes being configured for a different angular orientation of the image sensor, and applying the selected mesh to the current image of the stream of input images. For example, the image rotator 310 may select a mesh from the set of 180 meshes at 2° intervals, the set of 360 meshes at 1° intervals, or sets with other suitable divisions, as described above.

Figure 9:
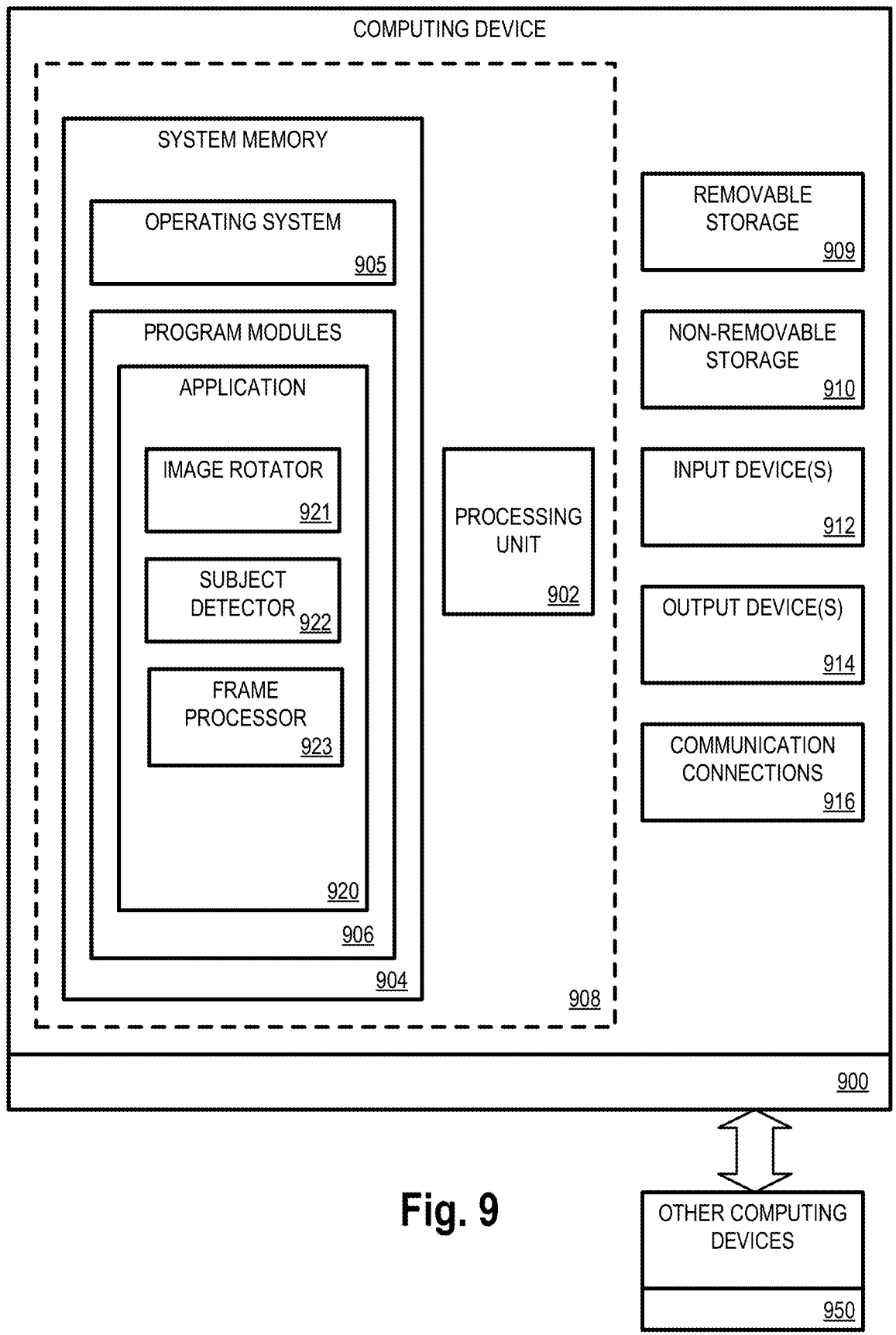
FIG. 9 is a block diagram illustrating example physical components of a computing device with which aspects of the disclosure may be practiced.
Figure 10:
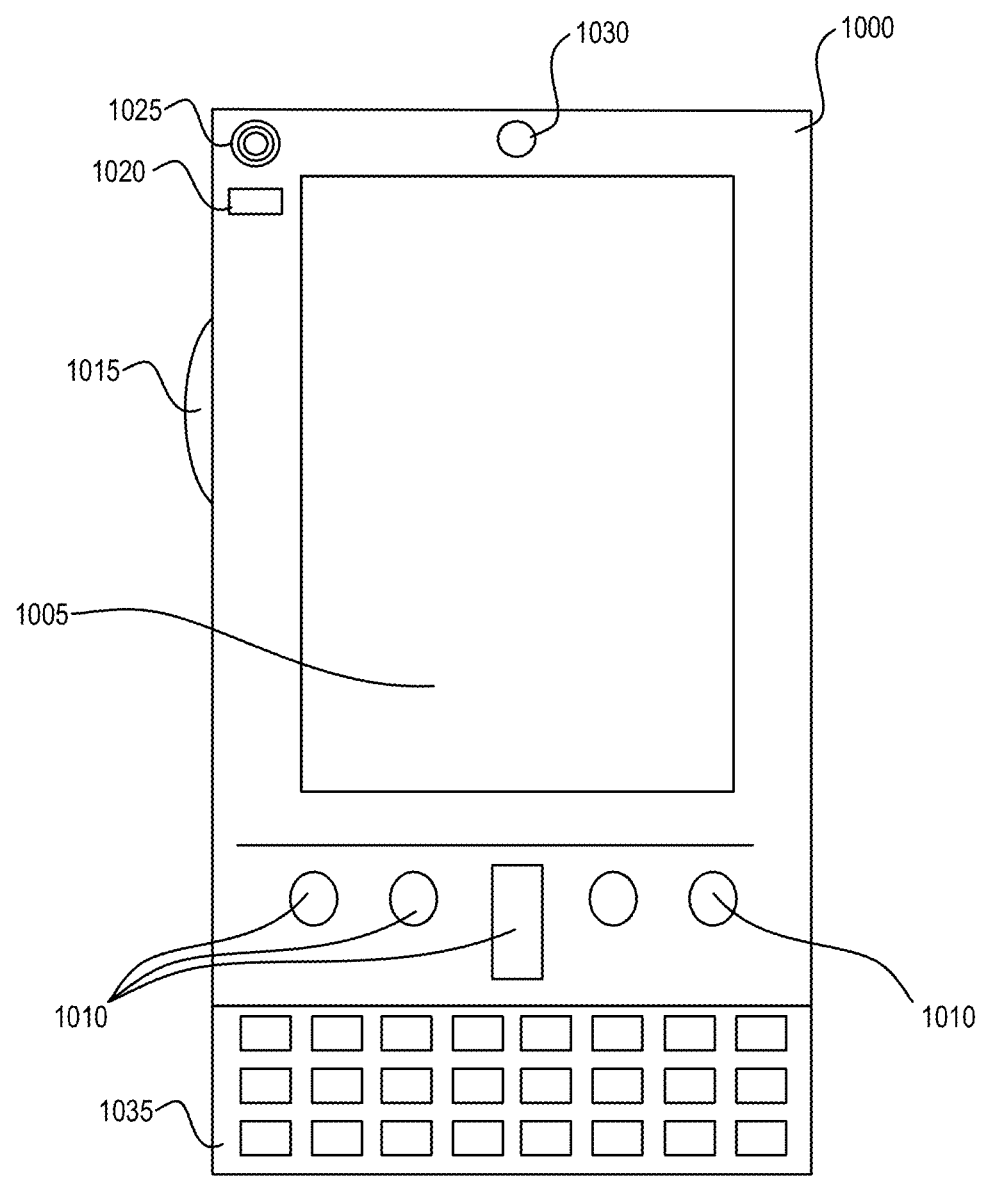
FIGS. 10 and 11 are simplified block diagrams of a mobile computing device with which aspects of the present disclosure may be practiced.
Figure 11:
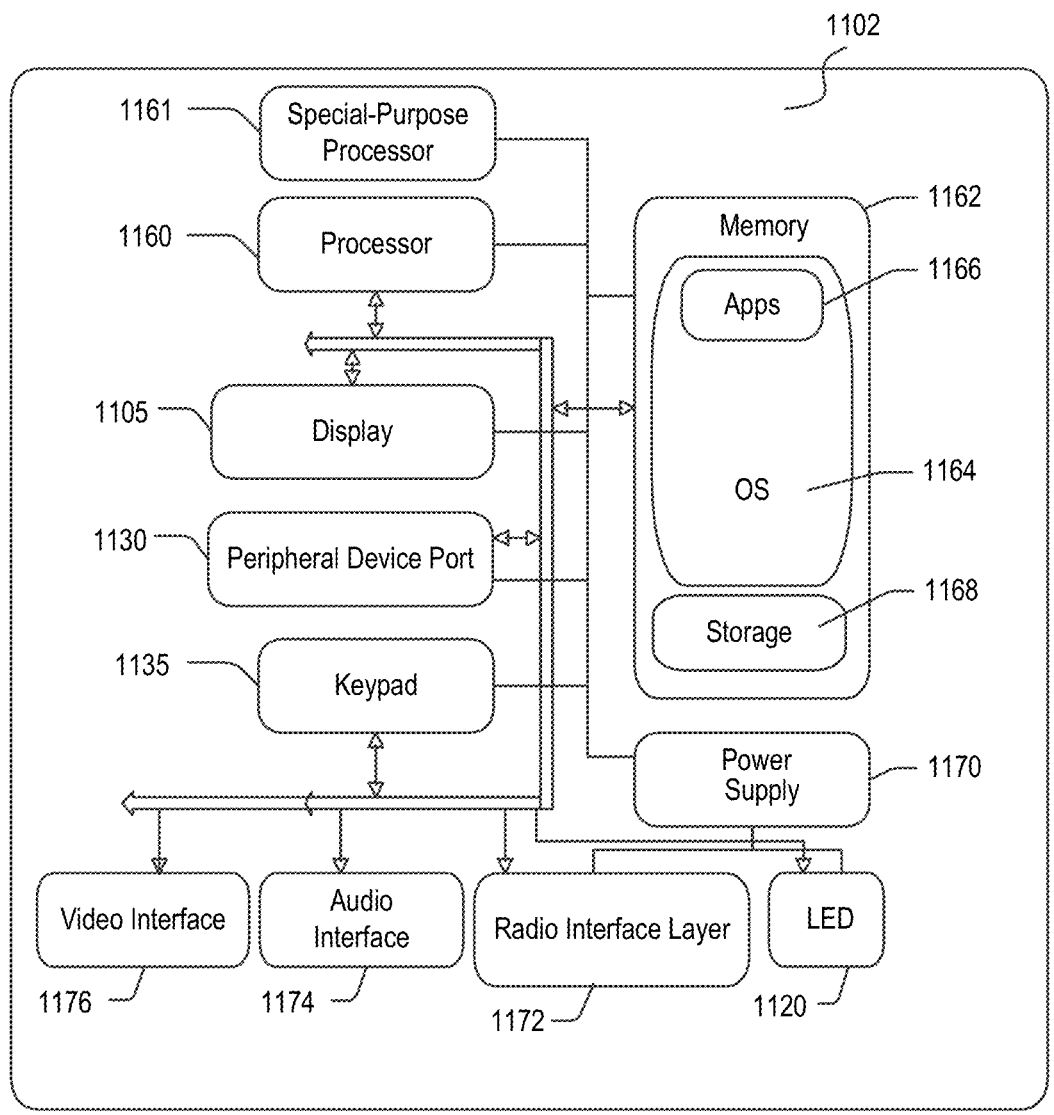

FIGS. 9, 10, and 11 and the associated descriptions provide a discussion of a variety of operating environments in which aspects of the disclosure may be practiced. However, the devices and systems illustrated and discussed with respect to FIGS. 9, 10, and 11 are for purposes of example and illustration and are not limiting of a vast number of computing device configurations that may be utilized for practicing aspects of the disclosure, as described herein.

FIG. 9 is a block diagram illustrating physical components (e.g., hardware) of a computing device 900 with which aspects of the disclosure may be practiced. The computing device components described below may have computer executable instructions for implementing a stream processor application 920 on a computing device (e.g., computing device 110, computing device 120), including computer executable instructions for stream processor application 920 that can be executed to implement the methods disclosed herein. In a basic configuration, the computing device 900 may include at least one processing unit 902 and a system memory 904. Depending on the configuration and type of computing device, the system memory 904 may comprise, but is not limited to, volatile storage (e.g., random access memory), non-volatile storage (e.g., read-only memory), flash memory, or any combination of such memories. The system memory 904 may include an operating system 905 and one or more program modules 906 suitable for running stream processor application 920, such as one or more components with regard to FIGS. 1 and 3 and, in particular, image rotator 921 (e.g., corresponding to image rotator 310), subject detector 922 (e.g., corresponding to subject detector 320), and frame processor 923 (e.g., corresponding to frame processor 330).

The operating system 905, for example, may be suitable for controlling the operation of the computing device 900. Furthermore, embodiments of the disclosure may be practiced in conjunction with a graphics library, other operating systems, or any other application program and is not limited to any particular application or system. This basic configuration is illustrated in FIG. 9 by those components within a dashed line 908. The computing device 900 may have additional features or functionality. For example, the computing device 900 may also include additional data storage devices (removable and/or non-removable) such as, for example, magnetic disks, optical disks, or tape. Such additional storage is illustrated in FIG. 9 by a removable storage device 909 and a non-removable storage device 910.

As stated above, a number of program modules and data files may be stored in the system memory 904. While executing on the processing unit 902, the program modules 906 (e.g., stream processor application 920) may perform processes including, but not limited to, the aspects, as described herein. Other program modules that may be used in accordance with aspects of the present disclosure, and in particular for allocating traffic to communication links, may include image rotator 921, subject detector 922, and frame processor 923.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 9 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 900 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 900 may also have one or more input device(s) 912 such as a keyboard, a mouse, a pen, a sound or voice input device, a touch or swipe input device, etc. The output device(s) 914 such as a display, speakers, a printer, etc. may also be included. The aforementioned devices are examples and others may be used. The computing device 900 may include one or more communication connections 916 allowing communications with other computing devices 950. Examples of suitable communication connections 916 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 904, the removable storage device 909, and the non-removable storage device 910 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 900. Any such computer storage media may be part of the computing device 900. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 10 and 11 illustrate a mobile computing device 1000, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 10, one aspect of a mobile computing device 1000 for implementing the aspects is illustrated. In a basic configuration, the mobile computing device 1000 is a handheld computer having both input elements and output elements. The mobile computing device 1000 typically includes a display 1005 and one or more input buttons 1010 that allow the user to enter information into the mobile computing device 1000. The display 1005 of the mobile computing device 1000 may also function as an input device (e.g., a touch screen display). If included, an optional side input element 1015 allows further user input. The side input element 1015 may be a rotary switch, a button, or any other type of manual input element. In alternative aspects, mobile computing device 1000 may incorporate more or less input elements. For example, the display 1005 may not be a touch screen in some embodiments. In yet another alternative embodiment, the mobile computing device 1000 is a portable phone system, such as a cellular phone. The mobile computing device 1000 may also include an optional keypad 1035. Optional keypad 1035 may be a physical keypad or a "soft" keypad generated on the touch screen display. In various embodiments, the output elements include the display 1005 for showing a graphical user interface (GUI), a visual indicator 1020 (e.g., a light emitting diode), and/or an audio transducer 1025 (e.g., a speaker). In some aspects, the mobile computing device 1000 incorporates a vibration transducer for providing the user with tactile feedback. In yet another aspect, the mobile computing device 1000 incorporates input and/or output ports, such as an audio input (e.g., a microphone jack), an audio output (e.g., a headphone jack), and a video output (e.g., a HDMI port) for sending signals to or receiving signals from an external device.

FIG. 11 is a block diagram illustrating the architecture of one aspect of a mobile computing device. That is, the mobile computing device 1000 can incorporate a system (e.g., an architecture) 1102 to implement some aspects. In one embodiment, the system 1102 is implemented as a "smart phone" capable of running one or more applications (e.g., browser, e-mail, calendaring, contact managers, messaging clients, games, and media clients/players). In some aspects, the system 1102 is integrated as a computing device, such as an integrated personal digital assistant (PDA) and wireless phone.

One or more application programs 1166 may be loaded into the memory 1162 and run on or in association with the operating system 1164. Examples of the application programs include phone dialer programs, e-mail programs, personal information management (PIM) programs, word processing programs, spreadsheet programs, Internet browser programs, messaging programs, and so forth. The system 1102 also includes a non-volatile storage area 1168 within the memory 1162. The non-volatile storage area 1168 may be used to store persistent information that should not be lost if the system 1102 is powered down. The application programs 1166 may use and store information in the non-volatile storage area 1168, such as email or other messages used by an email application, and the like. A synchronization application (not shown) also resides on the system 1102 and is programmed to interact with a corresponding synchronization application resident on a host computer to keep the information stored in the non-volatile storage area 1168 synchronized with corresponding information stored at the host computer.

The system 1102 has a power supply 1170, which may be implemented as one or more batteries. The power supply 1170 may further include an external power source, such as an AC adapter or a powered docking cradle that supplements or recharges the batteries.

The system 1102 may also include a radio interface layer 1172 that performs the function of transmitting and receiving radio frequency communications. The radio interface layer 1172 facilitates wireless connectivity between the system 1102 and the "outside world," via a communications carrier or service provider. Transmissions to and from the radio interface layer 1172 are conducted under control of the operating system 1164. In other words, communications received by the radio interface layer 1172 may be disseminated to the application programs 1166 via the operating system 1164, and vice versa.

The visual indicator 1120 may be used to provide visual notifications, and/or an audio interface 1174 may be used for producing audible notifications via an audio transducer 1025 (e.g., audio transducer 1025 illustrated in FIG. 10). In the illustrated embodiment, the visual indicator 1120 is a light emitting diode (LED) and the audio transducer 1025 may be a speaker. These devices may be directly coupled to the power supply 1170 so that when activated, they remain on for a duration dictated by the notification mechanism even though the processor 1160 and other components might shut down for conserving battery power. The LED may be programmed to remain on indefinitely until the user takes action to indicate the powered-on status of the device. The audio interface 1174 is used to provide audible signals to and receive audible signals from the user. For example, in addition to being coupled to the audio transducer 1025, the audio interface 1174 may also be coupled to a microphone to receive audible input, such as to facilitate a telephone conversation. In accordance with embodiments of the present disclosure, the microphone may also serve as an audio sensor to facilitate control of notifications, as will be described below. The system 1102 may further include a video interface 1176 that enables an operation of peripheral device 1130 (e.g., on-board camera) to record still images, video stream, and the like.

A mobile computing device 1000 implementing the system 1102 may have additional features or functionality. For example, the mobile computing device 1000 may also include additional data storage devices (removable and/or non-removable) such as, magnetic disks, optical disks, or tape. Such additional storage is illustrated in FIG. 11 by the non-volatile storage area 1168.

Data/information generated or captured by the mobile computing device 1000 and stored via the system 1102 may be stored locally on the mobile computing device 1000, as described above, or the data may be stored on any number of storage media that may be accessed by the device via the radio interface layer 1172 or via a wired connection between the mobile computing device 1000 and a separate computing device associated with the mobile computing device 1000, for example, a server computer in a distributed computing network, such as the Internet. As should be appreciated such data/information may be accessed via the mobile computing device 1000 via the radio interface layer 1172 or via a distributed computing network. Similarly, such data/information may be readily transferred between computing devices for storage and use according to well-known data/information transfer and storage means, including electronic mail and collaborative data/information sharing systems.

As should be appreciated, FIGS. 10 and 11 are described for purposes of illustrating the present methods and systems and is not intended to limit the disclosure to a particular sequence of steps or a particular combination of hardware or software components.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method for processing a stream of input images, the method comprising:
receiving a stream of input images from an image sensor, the stream comprising an initial sequence of input images including a subject having an initial orientation, wherein a lens associated with capturing the stream of input images causes, in captured images, lens distortion that is correctable by image processing using at least one pre-existing mesh, wherein the lens distortion is a geometric distortion and the mesh is not rotationally symmetric;
determining a change in an angular orientation of the image sensor and the lens while receiving the stream of input images;
in response to determining the change in the angular orientation, correcting a subsequent sequence of input images of the stream of input images for rotation to counteract the change in the angular orientation of the image sensor and maintain the subject in the initial orientation, including adjusting the at least one pre-existing mesh based on the change in the angular orientation; and transmitting the stream of input images, including the corrected sequence of input images, to one or more display devices.

2. The method of claim 1, wherein determining the change in angular orientation comprises receiving a current angular orientation from an orientation sensor associated with the image sensor.

3. The method of claim 2, further comprising filtering the current angular orientation from the orientation sensor with a smoothing filter.

4. The method of claim 1, wherein determining the change in angular orientation comprises tracking the subject through the stream of input images using a subject detector.

5. The method of claim 4, further comprising determining a bounding box for the subject within a current image of the stream of input images using the subject detector.

6. The method of claim 5, further comprising processing the current image to center the subject by cropping according to the bounding box.

7. The method of claim 1, wherein the initial orientation is a fixed reference orientation and is one of a portrait orientation and a landscape orientation.

8. The method of claim 1, wherein the lens distortion is rotationally symmetric with respect to geometry of captured images and correcting the subsequent sequence of input images of the stream of input images comprises performing a geometric transformation of a current image of the stream of input images based on the change in the angular orientation.

9. The method of claim 1, wherein adjusting the mesh comprises interpolating, based on the change in the angular orientation, among a plurality of discrete meshes that correspond to the lens and correct the geometric distortion.

10. The method of claim 1, wherein correcting the subsequent sequence of input images of the stream of input images comprises:

after adjusting the mesh, applying the adjusted mesh to a current image of the stream of input images.

11. The method of claim 1, wherein adjusting the mesh comprises rotating the mesh based on the change in the angular orientation;

wherein correcting the subsequent sequence of input images of the stream of input images comprises applying the rotated mesh to a current image of the stream of input images.

12. A method for processing a stream of input images, the method comprising:

receiving a stream of input images from an image sensor, the stream comprising an initial sequence of input images including a subject having an initial orientation, wherein a lens associated with capturing the stream of input images causes, in captured images, lens distortion that is correctable by image processing using at least one pre-existing mesh;

determining a change in an angular orientation of the image sensor and the lens while receiving the stream of input images;

in response to determining the change in the angular orientation, correcting a subsequent sequence of input images of the stream of input images for rotation to counteract the change in the angular orientation of the image sensor and maintain the subject in the initial orientation, including adjusting the at least one pre-existing mesh based on the change in the angular orientation; and transmitting the stream of input images, including the corrected sequence of input images, to one or more display devices;

wherein the lens distortion is a geometric distortion and the mesh is not rotationally symmetric;

wherein correcting the subsequent sequence of input images of the stream of input images for rotation comprises:

selecting the mesh from a plurality of discrete meshes based on the change in the angular orientation, each mesh of the plurality of discrete meshes being configured for a different angular orientation of the image sensor;

applying the selected mesh to a current image of the subsequent sequence of input images of the stream of input images.

13. A system for processing a stream of input images, the system comprising:

an image sensor configured to capture the stream of input images, the stream comprising an initial sequence of input images including a subject having an initial orientation;

a lens associated with capturing the stream of input images that causes, in captured images, lens distortion that is correctable by image processing using at least one pre-existing mesh, wherein the lens distortion is a geometric distortion and the mesh is not rotationally symmetric;

an orientation sensor configured to sense an angular orientation of the image sensor and the lens;

a stream processor configured to:

determine a change in an angular orientation of the image sensor while receiving the stream of input images; and in response to determining the change in the angular orientation, correct a subsequent sequence of input images of the stream of input images for rotation to counteract the change in the angular orientation of the image sensor and maintain the subject in the initial orientation, including adjusting the at least one pre-existing mesh based on the change in angular orientation;

apply the adjusted mesh to a current image of the subsequent sequence of input images of the stream of input images;

transmit the stream of input images, including the corrected sequence of input images, to one or more display devices.

14. The system of claim 13, wherein the stream processor is configured to center the subject within the current image.

* * * * *